Dec. 19, 1950  H. V. REED  2,534,991
CLUTCH PLATE
Filed Aug. 5, 1947  2 Sheets-Sheet 1
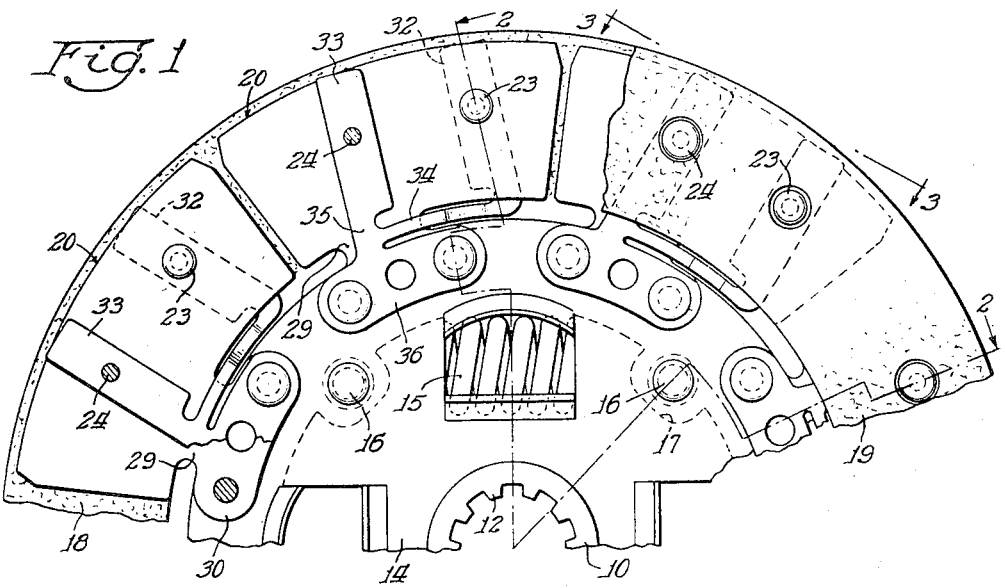
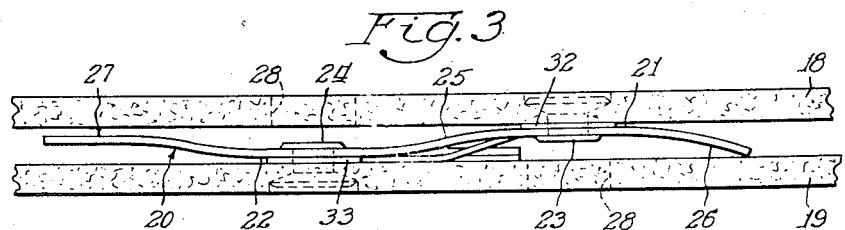
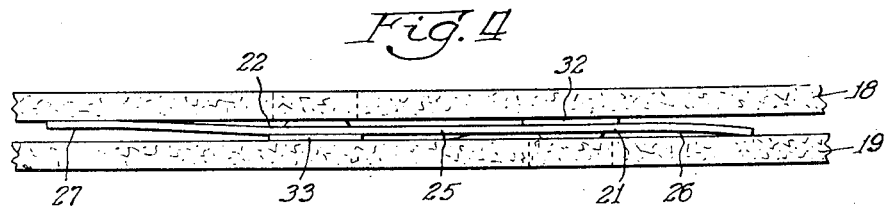
Inventor:
Harold V. Reed
By: Edward C. Gritzbaugh
Atty.

Dec. 19, 1950   H. V. REED   2,534,991
CLUTCH PLATE
Filed Aug. 5, 1947   2 Sheets-Sheet 2
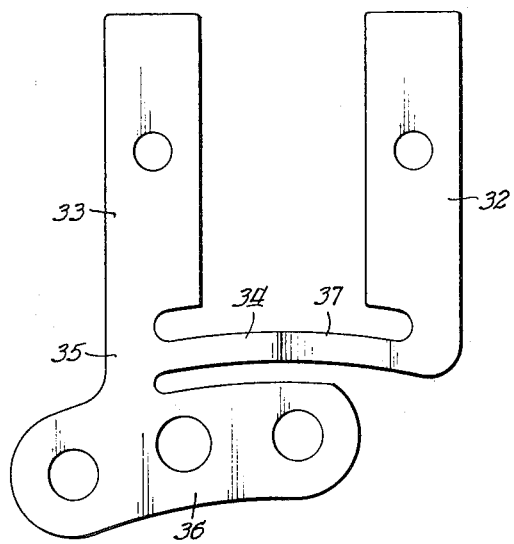
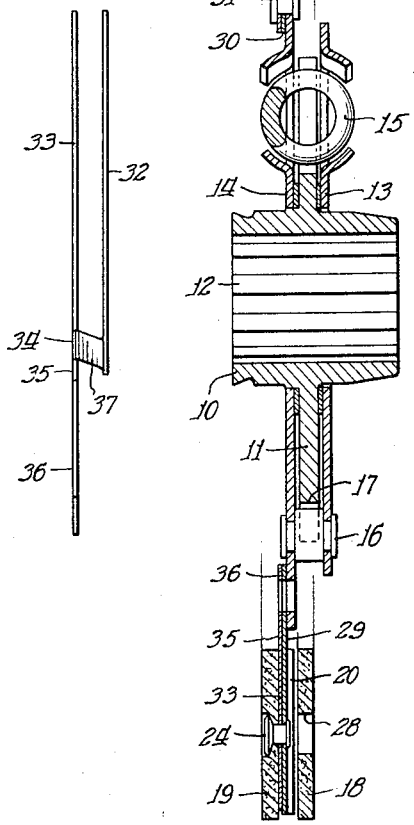
Inventor:
Harold V. Reed
By: Edward C. Gritzbaugh
Atty Patented Dec. 19, 1950

2,534,991

UNITED STATES PATENT OFFICE 2,534,991

CLUTCH PLATE

Harold V. Reed, Chicago, Ill., assignor to Borg-Warner Corporation, Chicago, Ill., a corporation of Illinois Application August 5, 1947, Serial No. 766,299

15 Claims. (Cl. 192—107)

The present invention relates to a friction clutch plate assembly, and has especial reference to means for eliminating, or at least reducing to a minimum, chatter which occurs in some clutch driven plate installations under certain operating conditions.

Friction clutch plates having axially spaced friction facings with wavy or undulated cushions secured between them have been found to possess a tendency to chatter in some types of installations and under certain conditions of operation. It has been ascertained that this chatter may be due to the amount of axial compression of the cushions resulting from clutch engagement. Experimentation has disclosed that a cushion plate having a large amount of deflection for a given pressure exerted laterally against it will eliminate the chatter which might be present in a cushion plate having a relatively small amount of deflection. When the cushion plate is of a preformed wavy or undulated character, and is attached at the wave crests to the friction facing members, there is a progressive engagement or contact between the facings and cushions while the cushions are being compressed or flattened towards or against the facings during clutch packing pressure. The beam portions of the cushions gradually become shorter as these regions of contact with the facings increasingly progress towards each other from the ends of the beams, and the springs become stiffer at the decreasing beam regions which have not contacted the facings. This progressive increase in contact between the cushion members and the facing members will usually continue until there is approximately complete surface contact between said members when the clutch is in loaded condition. Hence a higher clutch packing pressure is required to deflect the beam regions of the cushions because these regions become increasingly stiffer as the contact area between the facings and cushions increases and therefore more load is required to deflect the unsupported or cantilever portions of the cushion for each increment of deflection. As a result of these conditions, chatter may be noticeable in certain types of installations.

It has been found that the chatter may be eliminated in a number of installations by employing insertable members placed between the facings and the crowns of normally undulated cushions in the regions of at least one of the rivets which attaches the cushion to a facing. By reason of this arrangement the deflection of the spring cushion does not tend to progressively increase the tension of the beam region thereof because the facings are kept out of contact with adjacent portions of the cushions throughout a large portion of the compression range.

It is therefore one of the principal objects of this invention to simplify the construction of a friction clutch plate such as contemplated herein, and to improve the operation and efficiency of such plate.

Another principal object of the present invention is to provide effective means in a friction clutch plate which, in certain types of installations, will eliminate or at least reduce chatter to a minimum while the clutch is being engaged.

A further object hereof is to improve the engaging operation of the clutch plate by providing cushions wherein the beam length of the cushion is more or less constant and out of contact with the facing members throughout a large portion of the compression range.

Still another object of this invention resides in providing means in a friction clutch plate for maintaining the friction facing members out of contact with the wavy cushions during clutch engaging pressure, thereby to eliminate chatter in certain types of installations.

And another object hereof is to provide a friction clutch plate having cushioned facing members, wherein deflection is effected throughout a large portion of the compression range of each cushion, thus to dampen out the critical vibrations in the power system which induce chatter in the driving mechanism of a motor driven vehicle.

Other objects, aims and advantages of the invention contemplated herein will be apparent to persons skilled in the art after the construction and operation of the friction clutch plate is understood from the within description. It is preferred to accomplish the numerous objects of this invention, and to practice the same, in substantially the manner hereinafter fully described and as more particularly pointed out in the appended claims. Reference is now made to the accompanying drawings forming a part of this specification.

In the drawings:

Fig. 1 is a fragmentary elevation of a friction clutch plate showing an embodiment of the present invention.

Fig. 2 is an axial section taken along the plane of line 2—2 on Fig. 1.

Fig. 3 is an enlarged edge view along the plane of line 3—3 of Fig. 1, showing the facing members and a cushion prior to clutch engagement.

Fig. 4 is an edge view similar to Fig. 3 showing the relative positions of the cushion and facings under full load or clutch engaged pressure.

Fig. 5 is an enlarged elevational view showing details of an insert or spacer member such as contemplated herein.

Fig. 6 is a side edge view of the device shown in Fig. 5.

The drawings are to be understood as being more or less of a diagrammatic character for the purpose of disclosing typical or preferred forms of the invention contemplated herein. In these drawings like reference characters identify the same parts in the different views.

The friction clutch plate contemplated herein, as shown in detail in Figs. 1 and 2, comprises an inner region or unit which includes a central hub 10 with a radial flange 11 and having a splined bore 12 which adapts the assembly for axial sliding movement on the splined portion of a rotatable shaft (not shown). In addition to the hub and flange, the hub unit and inner region of the clutch plate comprises an annular washer or retainer plate 13 mounted on hub 10 at one side of the flange 11, and a similar annular washer 14 is mounted on the hub at the opposite side of flange 11, as shown in Fig. 2. A plurality of openings, apertures, recesses, or the like, are made in alignment with each other in the washers 13 and 14 and the hub flange 11 to receive a corresponding number of coil springs 15 for the purpose of effecting a torsional vibration dampener arrangement of a well-known type whereby relative rotative movement is effected between the washers and the hub. The two washers 13 and 14 are tied together by a plurality of spool pins 16, the ends of which are upset or headed over the outer faces of the washers, and the central barrels of such spool pins are positioned in openings or recesses 17 in the hub flange 11, to permit limited relative rotative movement between the hub and washers. Thus the inner region of the clutch plate includes a hub and an intermediate member which is comprised of washers 13 and 14. As best seen in Fig. 2, the retainer plate washer 14 is of wider diameter than that of washer 13 so that said washer 14 extends radially outwardly beyond the margin of washer 13 as well as the hub flange 11 to define the outer limits of the inner region or hub unit of the clutch plate assembly.

The outer region of the clutch plate assembly includes a pair of flat-faced friction facings 18 and 19 which take the form of axially separated annular rings of friction material the inner margins of which are spaced radially outward from the outer margin of retainer washer 14.

The means for mounting these friction facings 18 and 19 on the inner region or hub unit of the clutch plate assembly and, more particularly, the washer or mounting member 14, comprises a circumferentially interrupted spring ring between the friction facings, said ring having undulations which preferably effect the axial spacing of said facings. This interrupted spring ring, as best seen in Fig. 1, comprises a plurality of spring sheet metal cushions or cushion elements 20 of thinner gauge than the intermediate or washer plate 14 which permits them to yield and they are of generally rectangular or segmental shape. The major portions of these cushions, which are interposed between the facings 18 and 19, may have an undulated, wavy, or ogee form as shown in Fig. 3, wherein it will be seen that the crests 21 and 22 of the undulations of the cushion are close to the inner surfaces of the adjoining facings 18 and 19 and provide supporting portions of the cushion which are anchored to the respective facings by rivets 23 and 24. The beam portion 25 of the cushion, which lies between the rivets 23 and 24, is normally a compound or ogee curve, and the cantilever or end portions 26 and 27 of the cushions curve away from the respective attaching rivets toward the opposite friction facing and are subject to flexural stresses as hereinafter pointed out. The heads of the rivets are set in counterbores in the facings and the portions of each facing opposite a rivet is apertured as at 28 to accommodate the upset ends of the rivets for the opposite facing. The inner regions of the cushions have reduced neck portions 29 extending radially inward and are also formed with circumferentially elongated foot portions 30 as clearly shown in Fig. 1. These foot portions of the cushions overlap the margin of retainer plate washer 14 and are secured thereto by rivets 31, thus connecting the outer annular region of the clutch plate to the intermediate member or inner region of the clutch plate.

Heretofore under ordinary clutch operation, when axial pressure has been applied to the clutch outer region or facing assembly, there will be a relative movement between the facing rings tending to straighten the beam portion 25 of the cushions, and such movement, it has been ascertained, is responsible in some instances for the shortening of said beam portion, resulting in the creation of chatter between the parts. This is due to the fact that the cushions between the rivets will progressively contact the inner surfaces of the facing members and will require higher compressive force to be applied with the result that chatter often occurs in certain types of installations. For the purpose of providing a lower compression range for the cushions, the present invention contemplates the placing of a series of insertable members between the cushions and the inner surfaces of the respective adjoining friction facings. These insertable members may take the form of narrow spacers or spacer elements 32 and 33 which are inserted between the crests 21 and 22 of the cushions and the adjoining facings at the regions of the rivets 23 and 24, so that said rivets are effective to secure the spacers in position.

As seen in Fig. 1 these spacers or spacer elements, which are preferably metal pieces, have a generally rectangular form which are elongated in a direction radially of the clutch plate assembly and are preferably positioned with their longitudinal or radial axes parallel with each other. The spacer elements preferably contact the crests or supporting portions of the cushions at the locations of the rivets and hold the adjacent portions of the cushions in axially spaced relation to the planes of the adjoining friction facings. This arrangement is such that the crests or supporting portions of the cushions fall into two series which alternate with each other in a circumferential direction, with one of the two flat faced friction facings carried by the cushions being attached to the separate supporting portions of one series and the other being attached to the separate supporting portions of the other series. Also, there is interposed between the flat face of one of the friction facings and the supporting portions of one series, a first series of sheet metal spacer elements lying in a substantially common plane, with a second series of sheet metal spacer elements being interposed between the flat face of the other friction facing and the supporting portions of the other series and lying in a substantially common plane axially spaced from the plane in which the first series of spacer elements are disposed, the spacer elements of one series being thus circumferentially staggered with relation to the spacer elements of the other series. It will be seen that the rivets connect each spacer element with the friction facing and supporting portion between which the spacer element is interposed so that the spacer elements will function to maintain the supporting portions of the cushions out of surface contact with the friction facings to provide uniform flexing action of the adjacent portions of the cushions. It is apparent that when the clutch plate is under compression or engaged, the beam portions of the cushions will have been straightened as shown in Fig. 4, and said beam portions will not be brought into contact with the surfaces of the adjoining friction facings. Also, under compression, the cantilever end regions 26 and 27 of the cushions become compressed and somewhat straightened in the manner shown in Fig. 4. By reason of this particular arrangement a low rate of compression is maintained during the greater portion of the deflection of the cushions. An advantage of the present arrangement resides in having a lower rate of deflection at the critical point of engagement than is obtained with an undulated cushion having the crests in actual contact with the adjoining friction facings.

A preferred embodiment of the spacer device is shown in detail in Figs. 5 and 6, wherein it will be seen that each device has a generally U-shape and comprises a stamped sheet metal plate with parallel arms 32 and 33 which define a pair of spacers or spacer elements for the adjoining cushion member 20. The distance from center to center of arms 32 and 33 corresponds with the distance between the crowns or crests 21 and 22 on a wavy cushion as well as the spacing of rivets 23 and 24 which attach the cushions to the facings to permit said rivets to pass through the arms. A narrow web or strap portion 34 connects the radially inner regions of arms 32 and 33, and there is a narrow neck 35 between said web and the elongated foot 36, the latter having approximately the contour of the cushion foot 30 upon which it is superimposed as shown in Fig. 2. The rivets 31 which anchor the cushion to the clutch intermediate plate or washer 14 are utilized for attaching the spacer device to the inner region or intermediate member of the clutch plate. In order that the spacer arms 32 and 33 may be inserted between cushion crests and the adjoining facings, which are spaced apart axially, the bridge piece or strap member 34 has an oblique region 37 whereby spacer arm 32 is offset to the plane of the body of the metal sheet from which the spacer device is stamped as illustrated in Fig. 6. This arrangement facilitates the assembly operations during fabrication of the clutch plate.

While this invention has been described in its present preferred form and embodiment, it will be apparent to persons skilled in the art after understanding the invention, that various changes and modifications may be made therein without departing from the spirit or scope thereof. It is aimed in the appended claims to cover all such changes and modifications.

What is claimed is:

1. A friction clutch plate assembly comprising a pair of axially spaced annular friction facings; a plurality of normally circumferentially undulated spring cushions between said friction facings and riveted thereto at the radial crests of said undulations; and a plurality of U-shaped insertable spacer members each having radial arms which are offset axially with respect to each other, said arms being positioned respectively between the wave crests of said cushions and an adjoining facing in the region of at least one rivet and spacing regions of cushions adjacent said arms away from said facings.

2. In a clutch plate assembly, an inner rigid disc; a radially interrupted spring ring secured to the margin of said disc and having undulations; axially spaced friction facings secured to opposite sides of said spring ring at the crests of said undulations; and pairs of spacer members secured to the margin of said disc and extending outward between said friction facings and said spring ring, said spacer members being secured to said facings and spring ring at the crests of said undulations, whereby said spacer members are effective during clutch packing pressure to maintain said facings in non-contacting relationship with respect to regions of the spring ring lying between the crests of said undulations.

3. In a clutch plate assembly, an inner rigid disc; a radially interrupted spring ring comprising a plurality of undulated segments each having a foot portion secured to said disc; axially spaced friction facings secured to opposite sides of said segments at the crests of said undulations; spacer members of approximately U-shape arranged with their arms between said friction facings and said spring ring, said spacer members being secured to said facings and spring ring at the crests of said undulations; and foot portions on said spacer members attached to said disc at the locations of the foot portions of said spring ring segments, whereby said spacer member arms during clutch packing pressure are effective to maintain said facings in non-contacting relationship with respect to regions of the spring ring lying between the crests of said undulations during clutch packing pressure.

4. A clutch plate assembly as defined in claim 3 wherein, the arms of each spacer member are arranged in offset relation to each other.

5. In a clutch plate assembly, a plurality of cushions each having a circumferentially bowed portion; flat-faced, friction facing rings at the opposite sides of said cushions; spacer members disposed between the flat face of one of said friction facing rings and the crests of the bowed portions of said cushions; fastening means securing said one friction facing ring to said spacer members and cushions at the crests of said cushions, said cushions extending circumferentially beyond said spacer members, whereby to provide cantilever portions in said cushions disposed on either side of said spacer members; and means supporting the other friction facing ring in lateral registration with said one friction facing ring.

6. In a clutch plate assembly, a plurality of undulated cushions each having oppositely bowed portions; flat-faced, friction facing rings at the opposite sides of said cushions; spacer members interposed between the flat faces of said friction facing rings and the convex sides of said oppositely bowed portions; fastening means securing one of said friction facing rings to certain of said spacing members and cushions at the crests of one of the bowed portions of said cushions; and other fastening means securing the other friction facing to the remainder of said spacing members and cushions at the crests of the other of said bowed portions of said cushions, whereby said spacer members maintain the region of each cushion between the crests in non-contacting relationship with respect to said friction facing rings under normal clutch packing pressure.

7. A clutch plate assembly as defined in claim 6, in which portions of the cushions extend circumferentially beyond the spacer members and are constructed and arranged to provide cantilever action yieldably opposing movement of the friction facing rings toward each other.

8. A spacer device for use between the friction facing rings and cushion means of a clutch driven plate, said spacer device comprising a sheet metal stamping including a generally U-shaped portion having a base with a laterally offset region between the arms of the U so that said arms are disposed in laterally offset planes to enable the same to contact opposite sides of the cushion means, a foot portion, and a neck portion narrower than said foot portion and disposed in substantially radial alignment with one only of said arms and connecting said U-shaped portion with said foot portion.

9. In a clutch plate assembly, a circumferentially interrupted spring ring; axially spaced, flat faced, friction-facings disposed on opposite sides of said spring ring; and spacer members arranged in pairs between the flat faces of said friction-facings and said spring ring, the spacer members of each pair being interconnected and positioned on opposite sides of said spring ring and secured to said ring with one of said spacer members being secured to one of said friction-facings and the other of said spacer members being secured to the other of said friction-facings, said spacer members being disposed in non-overlapping relation circumferentially and having an uninterrupted region of the spring ring lying therebetween and being effective during clutch packing pressure to maintain said facings in non-contacting relationship with respect to said region of the spring ring lying between the spacers of each pair.

10. A clutch plate assembly as defined in claim 9, wherein the interrupted spring ring has undulations and the spacer members are located at the crests of said undulations on opposite sides of said interrupted spring ring.

11. A clutch plate assembly as defined in claim 9, wherein the spacer members comprise approximately U-shaped metal plates arranged with the arms of each plate axially offset to each other and interposed between the friction facings and adjoining regions of the spring ring.

12. In a clutch plate assembly, an inner portion and an outer portion, said inner portion comprising a mounting disc and said outer portion being disposed outwardly of said inner portion and comprising a circumferentially interrupted spring annulus comprised of a plurality of separate undulated segments connected to said disc and each having oppositely arranged crests and a region intermediate said crests, friction-facing rings at the sides of said spring annulus, rivets securing said friction-facing rings to said crests; and a plurality of spacers structurally independent of and separate from said segments and comprising generally U-shaped members having foot portions transverse to the arms thereof, the arms of said U-shaped spacer members being disposed upon opposite sides of said segments and interposed between said friction-facing rings and said crests, and said foot portions being secured to said disc, said spacer arms cooperating with said crests to maintain the intermediate region of each cushion segment out of contact with said friction-facing rings under clutch packing pressure.

13. In a friction clutch element comprising: a mounting member of sheet metal; a plurality of spring metal cushion elements, said cushion elements each comprising a cushion portion occupying an annular region lying beyond the outer radial limit of said mounting member, and an attaching portion overlapping and being securely attached to said mounting member, said cushion portion and said attaching portion being connected by a neck region of substantially less width than the width of either said attaching or cushion portion, said cushion portion including a friction-facing supporting portion and an adjacent portion which is subject to flexural stresses in use, said cushion elements being arranged so that said friction-facing supporting portions fall into two series, the supporting portions of one series alternating in a circumferential direction with the supporting portions of the other series; and two friction-facings carried by said cushion portions and having substantially flat confronting faces, one friction-facing supported by the supporting portions of one series and the other friction-facing supported by the supporting portions of the other series, those improvements which comprise: a first set of substantially flat metal spacer elements entirely structurally independent of said friction-facings and inserted between and engaging the flat face of one of said friction-facings and one series of friction-facing supporting portions and lying in a substantially common plane; a second set of substantially flat metal spacer elements structurally independent of said friction-facings and inserted between and engaging the flat face of the other of said friction-facings and the other series of friction-facing supporting portions and lying in a substantially common plane which is axially spaced from said first-mentioned plane, the spacer elements of one set being circumferentially spaced and staggered in non-overlapping relation with respect to the spacer elements of the other set, said two sets of spacer elements constituting the only spacer elements interposed between the friction-facings and the cushion elements; and means connecting each spacer element with the particular supporting portion and the particular friction-facing between which it is interposed, said substantially flat spacer elements maintaining said supporting portions out of contact with said faces of said friction-facings during flexing of said adjacent portions under clutch-packing pressure, and said spacer elements remaining substantially flat during said flexing of said adjacent portions.

14. A friction clutch element as defined in claim 13, in which the cushion portions of the spring metal cushion elements extend circumferentially beyond the spacer elements associated therewith and are constructed and arranged to be operable to provide cantilever action yieldably opposing movement of the friction facings toward each other.

15. A friction clutch element as defined in claim 13, in which the adjacent portion of each spring metal cushion element constitutes an end portion of the cushion element extending circumferentially beyond the spacer element associated therewith and constructed and arranged to flex in an axial direction to provide cantilever action yieldably opposing movement of the friction facings toward each other.

HAROLD V. REED.

REFERENCES CITED

The following references are of record in the file of this patent:

UNITED STATES PATENTS

| Number    | Name      | Date          |
|-----------|-----------|---------------|
| 2,222,507 | Hunt      | Nov. 19, 1940 |
| 2,283,112 | Wemp      | May 12, 1942  |
| 2,309,950 | Goodwin   | Feb. 2, 1943  |
| 2,333,308 | Goodwin   | Nov. 2, 1943  |
| 2,337,111 | Joyce     | Dec. 21, 1943 |
| 2,337,135 | Thelander | Dec. 21, 1943 |
| 2,380,835 | Goodwin   | July 31, 1945 |